United States Patent
Xu (10) Patent No.: US 10,668,794 B2
(45) Date of Patent: Jun. 2, 2020

(54) FASTENING MECHANISMS FOR TRUCK SOFT COVERS

(71) Applicant: Cixi City Liyuan Auto Parts Co., Ltd., Cixi (CN)

(72) Inventor: Enli Xu, Cixi (CN)

(73) Assignee: Cixi City Liyuan Auto Parts Co., Ltd., Shenzhen (CN)

( * ) Notice: Subject to any disclaimer, the term of this patent is extended or adjusted under 35 U.S.C. 154(b) by 0 days.

(21) Appl. No.: 16/133,664

(22) Filed: Sep. 17, 2018

(65) Prior Publication Data

US 2020/0062094 A1  Feb. 27, 2020

(51) Int. Cl.
| B60J 7/08 | (2006.01) |
| B60J 7/10 | (2006.01) |
| B60P 7/04 | (2006.01) |
| B60J 10/90 | (2016.01) |

(52) U.S. Cl.
CPC ............. B60J 7/104 (2013.01); B60P 7/04 (2013.01); *B60J 10/90* (2016.02)

(58) Field of Classification Search
CPC ............. B60J 7/104; B60J 10/90; B60P 7/04
See application file for complete search history.

(56) References Cited

U.S. PATENT DOCUMENTS

| 5,511,843 A * | 4/1996 | Isler | B60J 7/104 |
| | | | 296/100.17 |
| 5,788,315 A * | 8/1998 | Tucker | B60J 7/102 |
| | | | 160/395 |
| 5,934,735 A * | 8/1999 | Wheatley | B60J 7/102 |
| | | | 296/100.01 |
| 6,257,306 B1 * | 7/2001 | Weldy | B60J 7/102 |
| | | | 160/327 |
| 6,293,608 B1 * | 9/2001 | Dicke | B60J 7/102 |
| | | | 296/100.15 |
| 6,386,616 B1 * | 5/2002 | Wheatley | B60J 7/104 |
| | | | 296/100.16 |
| 7,384,090 B1 * | 6/2008 | Weldy | B60J 7/141 |
| | | | 296/100.16 |
| 7,963,585 B2 * | 6/2011 | Jones | B60J 7/104 |
| | | | 296/100.16 |
| 8,585,120 B2 * | 11/2013 | Rusher | B60J 7/141 |
| | | | 296/100.09 |
| 8,973,969 B1 * | 3/2015 | Potter | B60P 7/0876 |
| | | | 296/100.15 |
| 9,061,572 B2 * | 6/2015 | Potter | B60J 7/104 |
| 2010/0133872 A1 * | 6/2010 | Kosinski | B60J 7/102 |
| | | | 296/100.09 |

(Continued)

*Primary Examiner* — Lori L Lyjak
(74) *Attorney, Agent, or Firm* — Kilpatrick Townsend & Stockton LLP (57) ABSTRACT

The present invention is directed to truck cover systems and methods thereof. Embodiments of the invention provide a system for securing a flexible tonneau cover for a truck bed. The cover, when deployed, seals a truck bed to protect the bed and its contents from outside elements. The cover systems described herein may be modular and/or adjustable to fit trucks of any size without modifications to the truck. The fasteners used to secure the cover to the truck bed rails are designed to withstand the forces of attaching and removing the cover over time. The cover system may be quickly and easily installed without the need for drilling. Once installed, the cover systems described herein are rugged and stable.

20 Claims, 10 Drawing Sheets

(56) References Cited

U.S. PATENT DOCUMENTS

2015/0239388 A1* 8/2015 Potter ................... B60P 7/04
                                                    296/100.12
2016/0107515 A1* 4/2016 Shi ....................... B60J 7/062
                                                    296/100.18

* cited by examiner

FASTENING MECHANISMS FOR TRUCK SOFT COVERS

BACKGROUND OF THE INVENTION

The present invention is directed to truck cover systems and methods thereof.

Flexible covers are often used to cover and seal the beds of pickup trucks to protect cargo from weather, debris, and other damaging conditions. Oftentimes, the cover will be connected to rails that are attached to the bed of the truck using a releasable fasteners, such as a hook and loop fastener mechanism. The fasteners are often coupled to the rails using slats that may slide into a channel within the rails. Conventional fasteners are secured onto the slats using an adhesive or by stitching. The release force from the separation of the fastener on the rail and the fastener on the cover may exceed the holding force of adhesives used to secured the fastener to the slat, leading to the peeling and ultimate separation of the fastener from the slat. In systems using stitched-on fasteners, the stitching reduces the area on which force is applied on the fastener. This reduction in area results in increased force on the area near the stitching, leading to the fastener be damaged and/or separated from the rail. Additionally, the mechanisms used to secure the rails to the bed may be unstable or difficult to set up.

Therefore, new and improved truck cover systems are desired.

BRIEF SUMMARY OF THE INVENTION

The present invention is directed to truck cover systems and methods thereof. Embodiments of the invention provide a system for securing a flexible tonneau cover for a truck bed. The cover, when deployed, seals a truck bed to protect the bed and its contents from outside elements. The cover systems described herein may be modular and/or adjustable to fit trucks of any size without modifications to the truck. The fasteners used to secure the cover to the truck bed rails are designed to withstand the forces of attaching and removing the cover over time. The cover system may be quickly and easily installed without the need for drilling. Once installed, the cover systems described herein are rugged and stable.

According to an embodiment, the present invention provides a flexible tonneau cover system for covering a bed of a pickup truck. The system includes a first end rail comprising a first opening and a second opening. The system also includes a first corner member comprising a plurality of tabs and a screw housing. The plurality of tabs has a first tab and a second tab. The first tab is adjustably inserted into the first opening. The second tab being adjustably inserted into the second opening. The first tab has a first screw opening. The system also includes a first screw securing the first corner member to the first end rail via the first opening and the first screw opening. The system further includes a first side rail comprising a first fastening slot and a first mounting surface. The first mounting surface includes a second screw opening. The second screw opening is characterized by an elongated shape to allow screw movement. The system additionally includes a second screw securing the first corner member to the first side rail via the screw housing and the second screw opening.

According to another embodiment, the present invention provides a flexible tonneau cover system for covering a bed of a pickup truck. The system includes a first end rail. The system also includes a first corner member comprising a screw housing. The first corner member is coupled to the first end rail. The system additionally includes a first side rail comprising a first fastening slot and a first mounting surface. The first mounting surface has a first screw opening. The first screw opening is characterized by an elongated shape to allow screw movement. The system additionally includes a fastening mechanism positioned within the first fastening slot. The fastening mechanism includes a wrap stitched to a slat, the wrap comprising a first fastening surface. The system additionally includes a first screw securing the first corner member to the first side rail via the screw housing and the first screw opening.

Embodiments of the present invention can be implemented in conjunction with existing systems and processes. Flexible cover systems according to embodiments of the present invention can be installed onto different models and makes of trucks without requiring permanent altering vehicles (e.g., drilling holes). Additionally, flexible truck covers can be quickly and securely deployed. There are other benefits as well.

The present invention achieves these benefits and others in the context of known technology. However, a further understanding of the nature and advantages of the present invention may be realized by reference to the latter portions of the specification and attached drawings.

DETAILED DESCRIPTION OF THE INVENTION

The present invention is directed to truck cover systems and methods thereof. Embodiments of the invention provide a system for securing a flexible tonneau cover for a truck bed. The cover, when deployed, seals a truck bed to protect the bed and its contents from outside elements. The cover systems described herein may be modular and/or adjustable to fit trucks of any size without modifications to the truck. The fasteners used to secure the cover to the truck bed rails are designed to withstand the forces of attaching and removing the cover over time. The cover system may be quickly and easily installed without the need for drilling. Once installed, the cover systems described herein are rugged and stable.

Figure 1A:
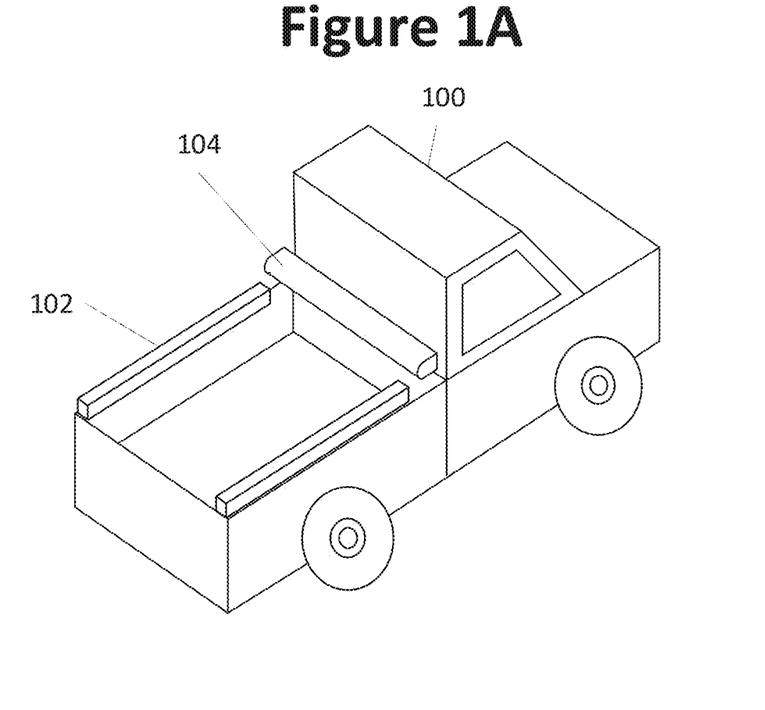
FIG. 1A shows a pickup having a tonneau cover in a stowed position according to embodiments.
Figure 1B:
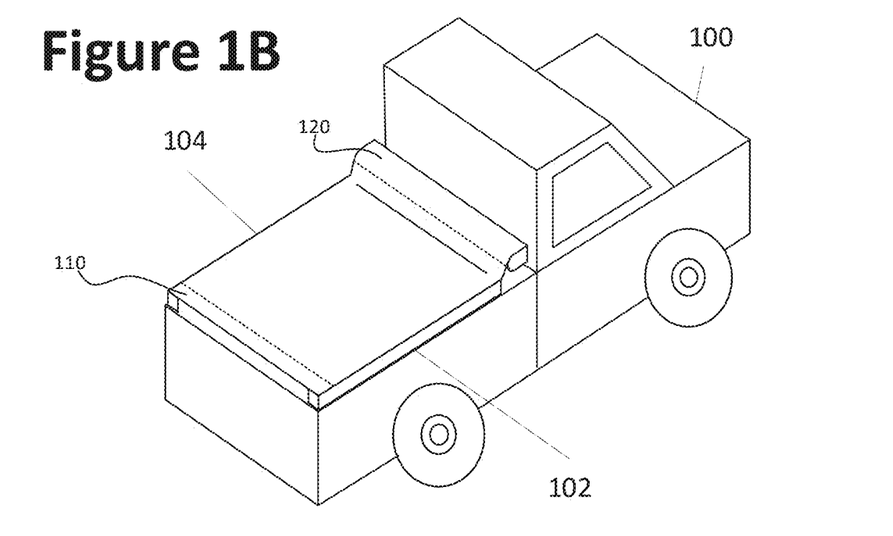
FIG. 1B shows the pickup of FIG. 1A with the tonneau cover in an extended position according to embodiments.

Referring now to FIGS. 1A and 1B, an embodiment of a pickup truck 100 having a flexible tonneau cover 104 is shown. These diagrams merely provide an example, which should not unduly limit the scope of the claims. One of ordinary skill in the art would recognize many variations, alternatives, and modifications. Truck 100 may include a set of side rails 102 that may be coupled with a bed rail of truck 100 above and/or outside of the bed. For example, the side rail 102 may be secured to the bed rails using clamps (not shown). In some embodiments, flexible cover 104 may be coupled with a back of a cab of truck 100 and/or with a front of the bed of truck 100. As seen in FIG. 1A, flexible cover 104 may be in a first, stowed configuration. In the stowed configuration, the flexible cover 104 may be rolled or otherwise folded and stored at a front of the bed of truck 100. As seen in FIG. 1B, flexible cover 104 may also be in a second, extended configuration. In the extended configuration, flexible cover 104 may be drawn over all or part of the bed of truck 100, such that all or a portion of the bed of truck 100 is sealed from the elements. Flexible cover 104 may be coupled with side rails 102 using one or more fasteners positioned along a length of the flexible cover 104 and/or the side rails 102. The flexible cover 104 comprises two end regions 110 and 120. And moveable end rail (not shown, as it is underneath the flexible cover) is positioned at region 110, and it is secured to the side rails when the flexible cover 104 is extended over the truck bed to provide cover. A secured end rail is positioned at region 120, and this end rail stays t region 120 in both extended and rolled configurations of the flexible cover 104.

Figure 2:
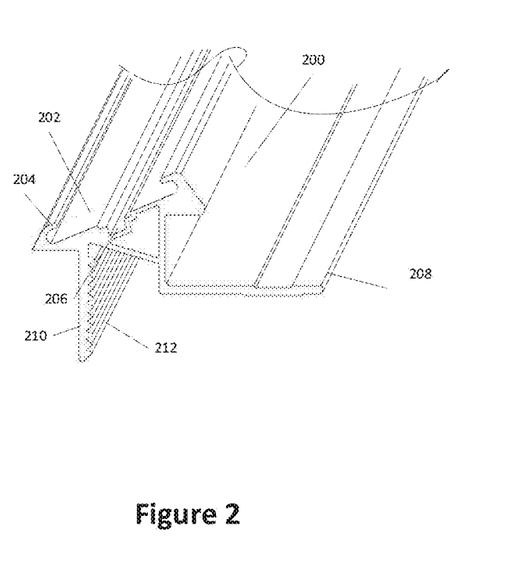
FIG. 2 is an isometric view of a side rail according to embodiments.
Figure 3:
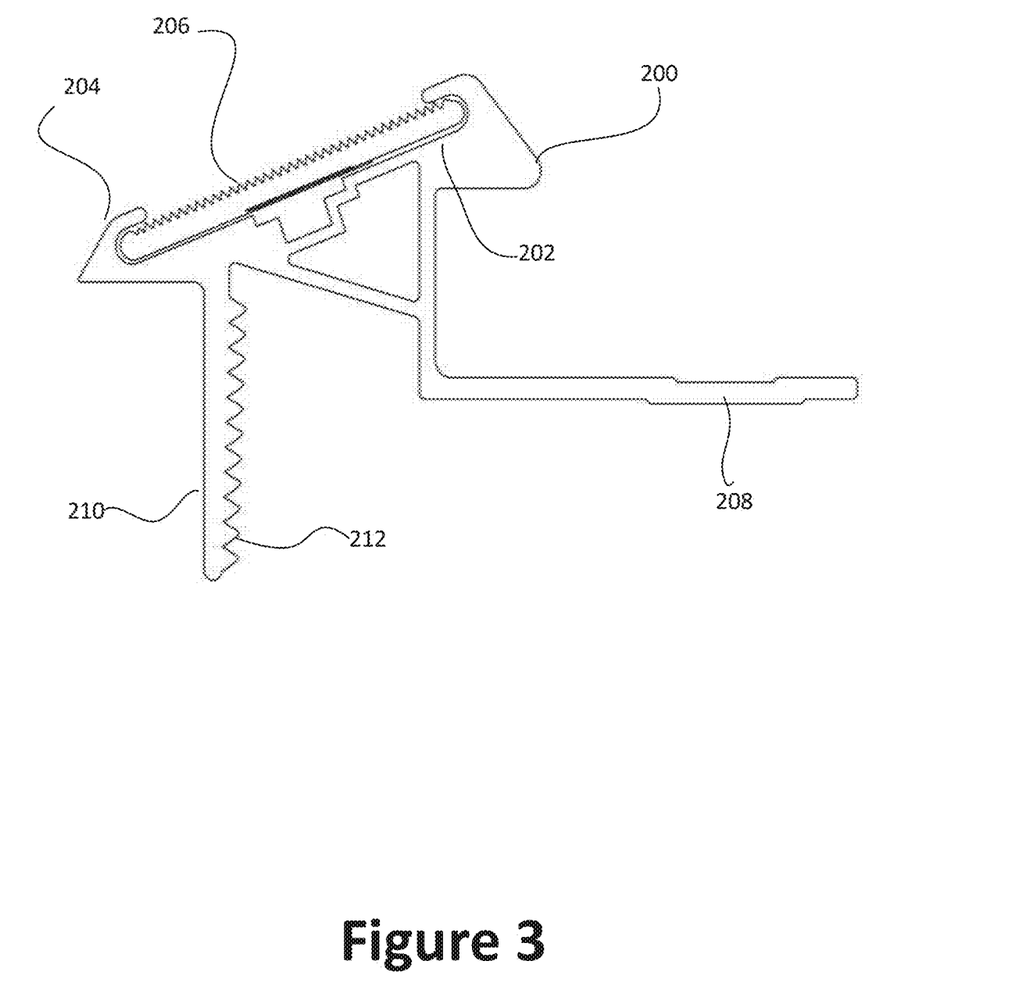
FIG. 3 is a side view of the side rail of FIG. 2 according to embodiments. a side view of the side rail of FIG. 3A secured to a cover according to embodiments.

FIGS. 2-3 depict one embodiment of a side rail 200 that is mountable on a bed rail of a truck. These diagrams merely provide an example, which should not unduly limit the scope of the claims. One of ordinary skill in the art would recognize many variations, alternatives, and modifications. Side rail 200 may include a slot 202 configured to slidingly receive a fastening slat (206 in FIG. 3). In some embodiments, the slot 202 may include one or more retaining members 204 configured to secure the fastening slat within the slot 202. Slot 202 may also include a channel that may receive an extension of the fastening slat, such as stitching and/or material extending from a bottom of the slat, or a fin portion that may help prevent rotational motion, as seen in FIG. 3. In some embodiments, the side rail 200 may include a base 208 that may be positioned atop the bed rail of a truck and used to clamp or otherwise secure side rail 200 to the bed rail. Base 208 may help maintain side rail 200 at a proper angle and/or position relative to the bed rail. A pad (not shown) may be positioned between base 208 and the bed rail to prevent damage, such as scratches, to the bed rail. Side rail 200 may also include a mating portion 210. Mating portion 210 may be used as an alternative to base 208 to secure the side rail 200 to the bed rail. For example, clamps may be used to clamp mating portion 210 to the bed rail. Clamping portion 210 may include a textured surface or other mating feature 212 that may interface with a corresponding feature of a clamp or other fastener to secure the side rail 200 to the bed rail. For example, a mating feature 212 that includes a number of teeth may correspond to teeth on a clamp to prevent the clamp from slipping when interfaced with the mating feature 212. In some embodiments, the side rail 200 may be designed such that slot 202 is positioned above and/or outside of the bed rail. This ensures that when a cover is attached to a fastening element within slot 202, the cover will extend over the entire truck bed. This helps seal and protect the bed and its contents. Depending on the implementation, some embodiments of side rails may not include bases and/or mating features.

Figure 4:
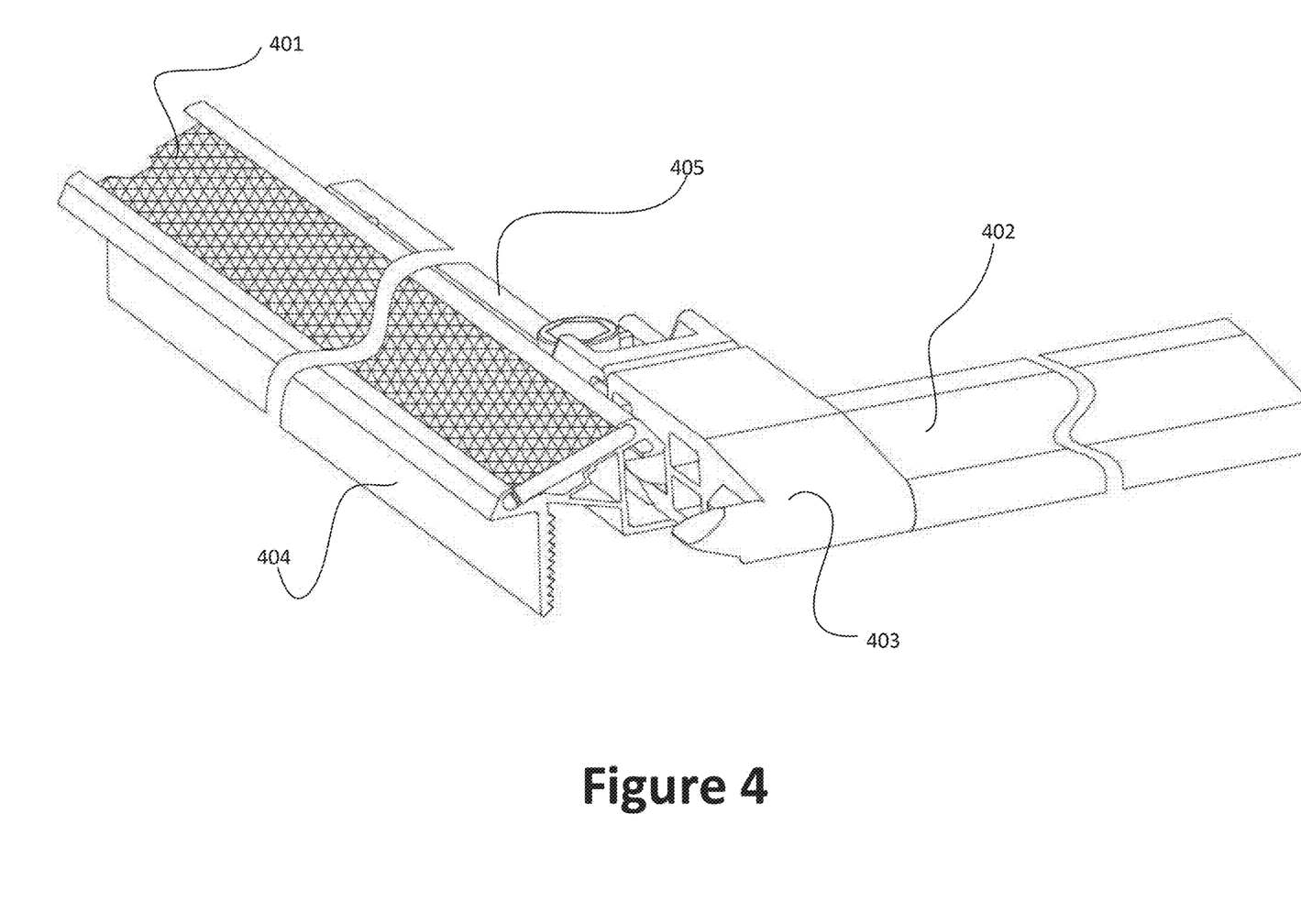
FIG. 4 is a simplified diagram illustrating a side rail coupled to an end rail

FIG. 4 is a simplified diagram illustrating a side rail coupled to an end rail according to embodiments of the present invention. This diagram is merely an example, which should not unduly limit the scope of the claims. One of ordinary skill in the art would recognize many variations, alternatives, and modifications. End rail 402 is coupled to the side rail 405 via a corner member 403. For example, both end rail 402 and corner member 403 are substantially immovable once installed onto a truck bed. In various embodiments, end rail 402 and corner member 403 are both positioned at region 120 in FIG. 1B. As explained below, end rail 402 is coupled to corner member 403 by both screws and extended tabs (not shown) of corner member 403. As explained above, side rail 405 is clamped to the truck bed via surface 404. The fastening surface 401 provides an interface for coupling to the flexible truck cover. For example, fastening surface 401 includes hook and/or loop fasteners, which are to be operably coupled to hook and/or loop fasteners on the flexible cover.

Figure 5:
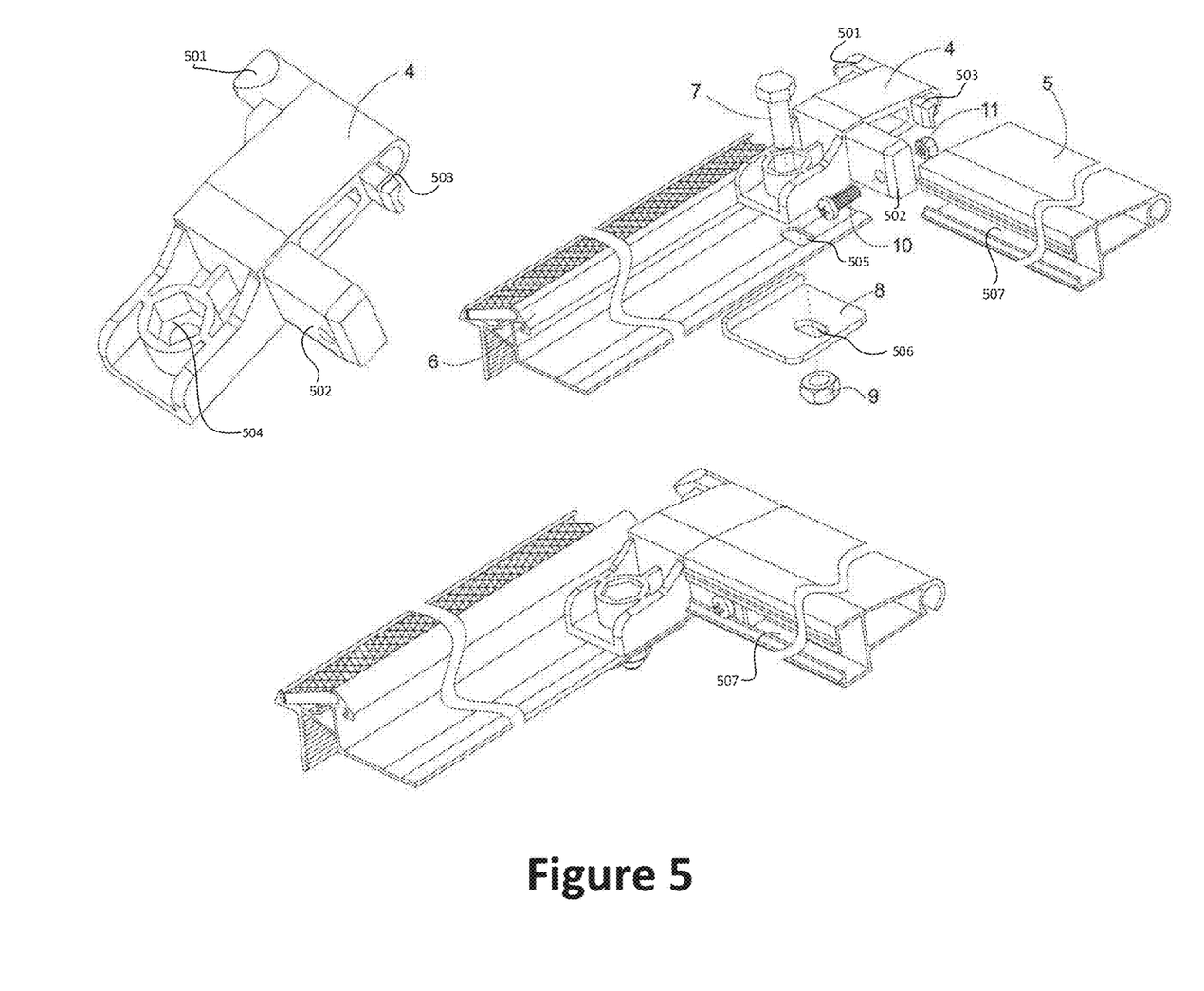
FIG. 5 is a simplified diagram illustrating coupling of an end rail to a side rail according to embodiments of the present invention.

FIG. 5 is a simplified diagram illustrating coupling of an end rail to a side rail according to embodiments of the present invention. This diagram is merely an example, which should not unduly limit the scope of the claims. One of ordinary skill in the art would recognize many variations, alternatives, and modifications. In FIG. 4, end rail 402 is coupled to side rail 404 via corner member 403. In FIG. 5, end rail 5 is coupled to the side rail 6 via corner member 4 as shown. Corner member 4 includes tab 502 and tab 503 that are to be inserted into end rail 5. In various embodiments, corner member 4 comprises strong polymer material. Depending on the implementation, other types of materials can be used as well. Corner member 4 additionally includes tab 501 for mounting onto a truck bed. Corner member 4 is coupled to the side rail 6 by a screw assembly that includes screw 7 and bolt 9. Corner member 4 includes a screw opening 504 as shown to accommodate screw 7. Screw opening 504 is characterized by a hexagonal shape that matches the head shape of screw 7. In various embodiments, when operating the screw assembly, screw opening 504 keeps screw 7 locked as bolt 9 is turned. When coupling corner member 4 onto side rail 6, screw 7 passes through opening 504 of corner member 4, opening 505 of side rail 6, and opening 506 of mounting plate 8. Opening 505 and opening 506 are both characterized by an extended shape, which provides a little bit of wiggle room for screw 7 and corner member 4 to move. In a specific embodiment, screw 7 is characterized by a diameter of 5 mm, and the extended shape of openings 505 and 506 is characterized by an end-to-end distance of about 8 mm (with a width of about 5 mm), which translates to a freedom of movement of about 3 mm.

Tab 502 and tab 503 of corner member 4 are inserted into end rail 5 when corner member 4 is coupled to end rail 5. End rail 5 includes openings specifically designed to accommodate tab 502 and 503. By having two tabs inserted corner member 4, corner member 4 is rotationally fixed relative to end rail 5. Tab 503 is simply inserted into a specific opening (not shown from the present view in FIG. 4) of side rail 5. Tab 502 is inserted into opening 507 and secured by a screw assembly that includes screw 10 and bolt 11. Depending on the installation process and fitting, the exact position of tab 502 within opening 507 can be adjusted, with the limitation that tab 502 must be positioned deep enough inside opening 507 to allow tab 503 to be positioned inside its corresponding opening.

Figure 6:
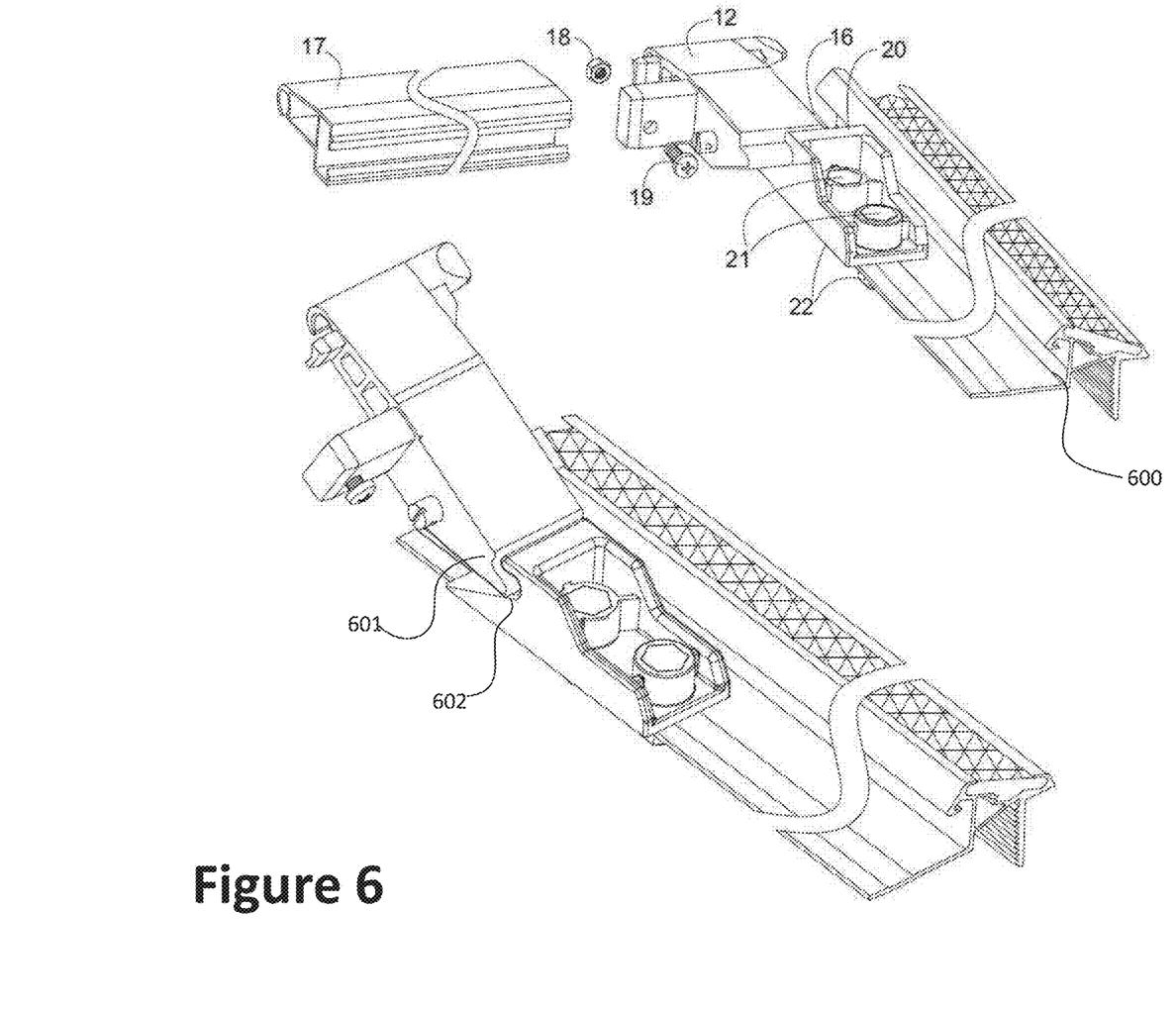
FIG. 6 is a simplified diagram illustrating coupling of a moveable end rail to a side rail according to embodiments of the present invention.

FIG. 6 is a simplified diagram illustrating coupling of a moveable end rail to a side rail according to embodiments of the present invention. This diagram is merely an example, which should not unduly limit the scope of the claims. One of ordinary skill in the art would recognize many variations, alternatives, and modifications. As illustrated in FIG. 1B, flexible cover 104 comprises two end regions 110 and 120. And moveable end rail (not shown, as it is underneath the flexible cover) is positioned at region 110, and it is secured to the side rails when the flexible cover 104 is extended over the truck bed to provide cover. For example, end rail 17 in FIG. 6 is positioned at region 110 of the flexible cover 104. End rail 17 is coupled to side rail 600 via corner member 12. Corner member 12 comprises two tabs that are to be inserted into end rail 17, and one of these tabs is secured onto end rail 17 by screw 19 and bolt 18. For example, relative positions between end rail 17 and corner member 12 is slightly adjustable, depending on how deep these two tabs of corner member 12 is inserted into end rail 17. A mounting member 20 is screwed onto side rail 600 as shown. For example, screw set 21 and screw set 22 secure mounting member 20 onto side rail 600. In various embodiments, location of mounting member 20 is adjustable relative to side rail 600. For example, adjustment may be made relative to the size of truck bed and desired position of the flexible cover. To couple end rail 17 to side rail 600, an extended region 601 is inserted into opening 602 of the mounting member. For example, to couple end rail 17 to side rail 600, corner member 12 is inserted at an angle (shown on the bottom diagram), and for the extended region 601 to be fully inserted into the opening 602, corner member 12 is lowered to a position that is flat relative to mounting member 20 (shown on the top diagram). When extended region 601 is fully inserted into opening 602, the assembly of end rail 17 and corner member 12 is coupled and secured to side rail 600. Tab 16 of corner member 12 (which is spring loaded as described below) provides a locking mechanism to keep corner member 12 locked to side rail 600.

Figure 7:
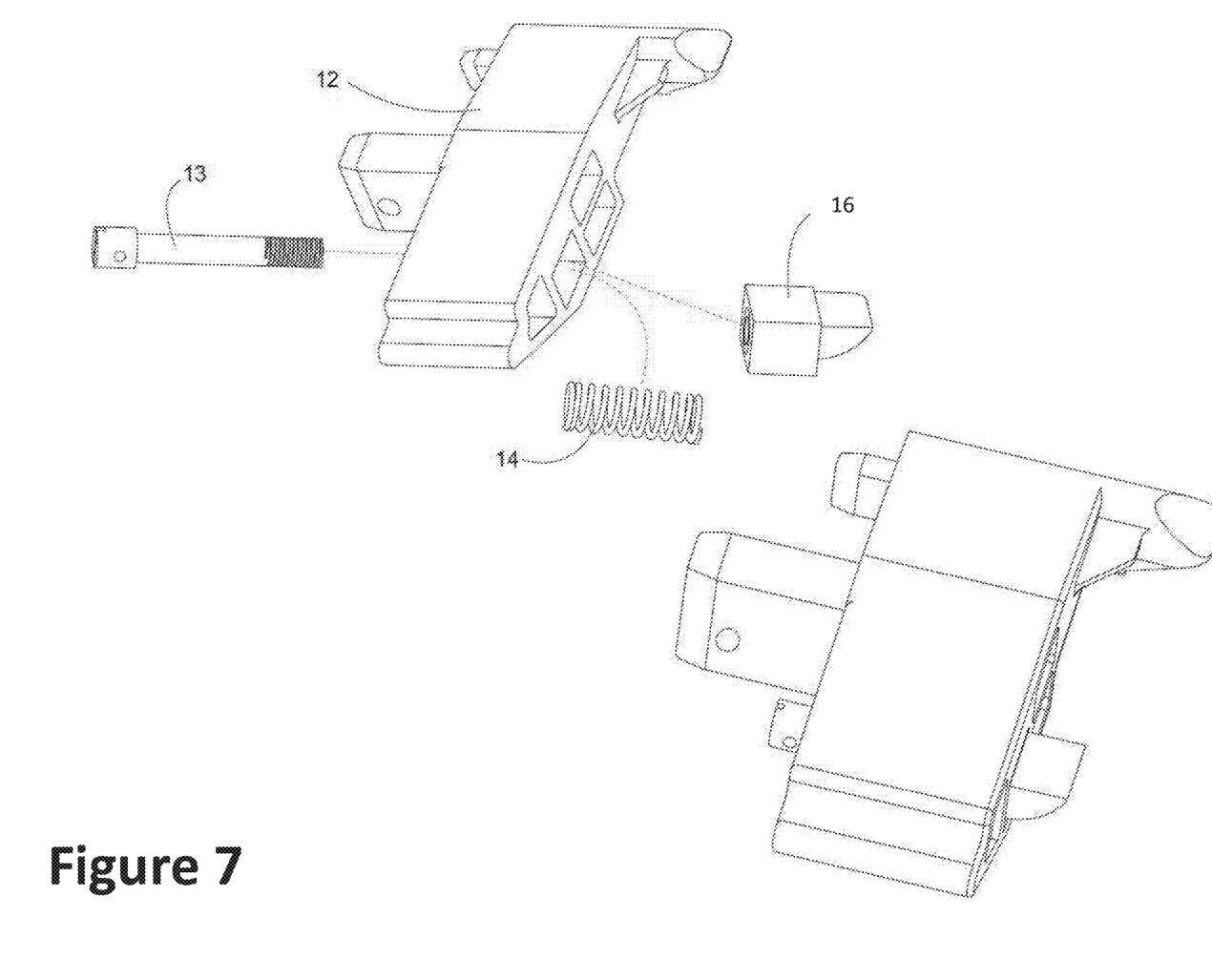
FIG. 7 is a simplified diagram illustrating corner member 12 according to embodiments of the present invention.

FIG. 7 is a simplified diagram illustrating corner member 12 according to embodiments of the present invention. This diagram is merely an example, which should not unduly limit the scope of the claims. One of ordinary skill in the art would recognize many variations, alternatives, and modifications. Tab 16 is secured onto corner member 12 by screw 13 (tab 16 has corresponding threads to accommodate screw 13) and spring 14. Being spring-loaded, tab 16 provides a locking mechanism as explained above.

Figure 8:
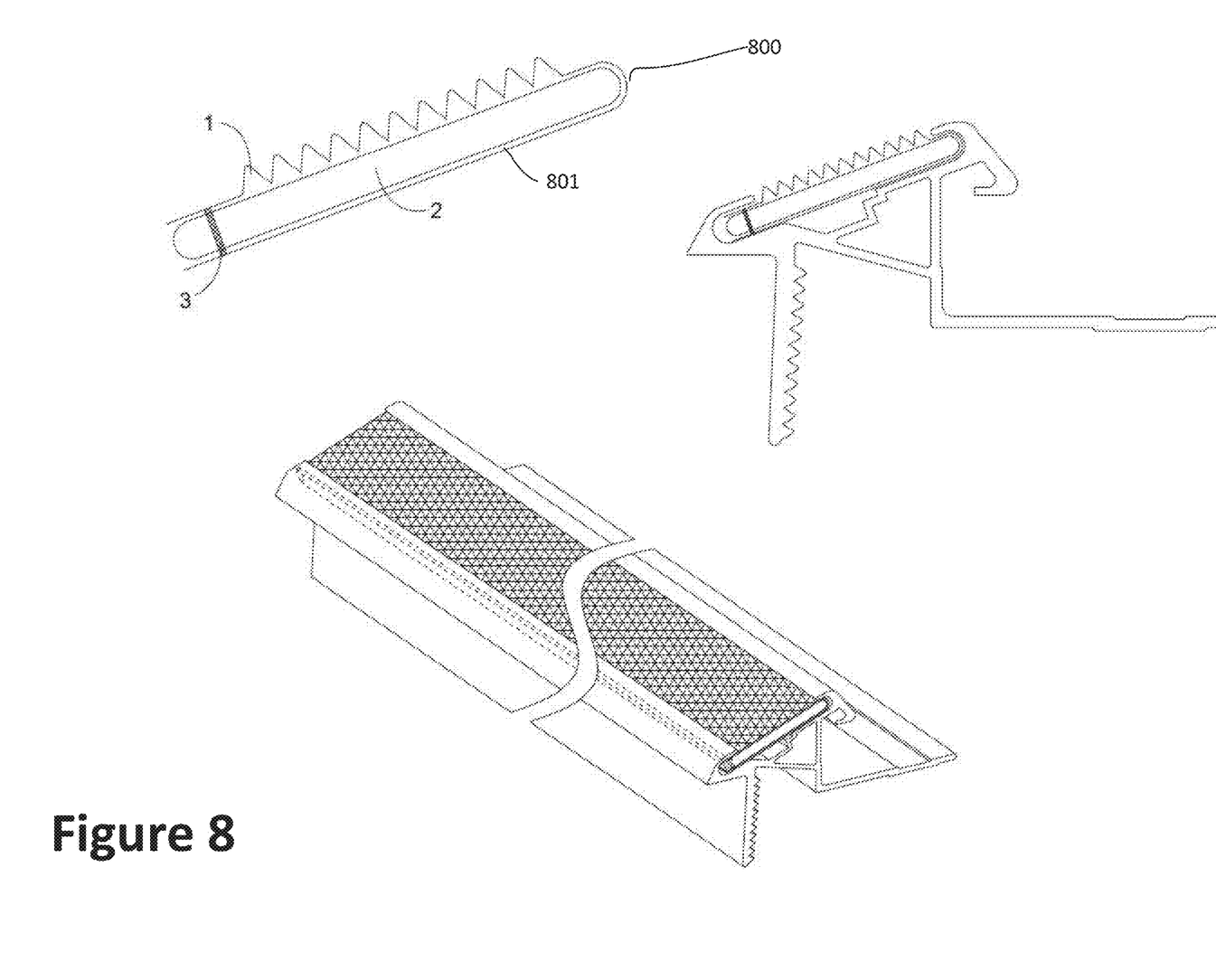
FIG. 8 is a simplified diagram illustrating a side rail fastening mechanism according to embodiments of the present invention.

FIG. 8 is a simplified diagram illustrating a side rail fastening mechanism according to embodiments of the present invention. This diagram is merely an example, which should not unduly limit the scope of the claims. One of ordinary skill in the art would recognize many variations, alternatives, and modifications. For example, FIG. 3 illustrates a fastening slat that is inserted to a slot (202 in FIG. 3). Fastening mechanism 800 includes a fastening surface 1 (a part of wrap 801), a slat 2, and stitching 3 as shown on its side view. For example, fastening surface 1 comprises hook and loop fasteners type of fastening mechanism. In various embodiments, the fastening surface 1 and stitching 3 are waster resistance and substantially free from shrinking or other types of shape changes. The isometric view on the bottom of FIG. 8 shows fastening mechanism 800 already inserted into a side rail. For example, fasten mechanism 800 has approximately the same length as the side rail, which is typically as long as the truck bed. In various embodiments, the fastening surface 1 is a part of wrap 801 that goes around slat 2. The stitching 3 (dotted line shown in the isometric view) extends through the length of fastening mechanism 800, and it goes through slat 2, which reduces unnecessary movements of slat 2 inside the wrap 801. It is to be appreciated that only a single row of stitching is used as shown in FIG. 8, as an excessive amount of stitching may potentially damage the structure integrity of the underlying slat 2. In addition, by stitching wrap 801 using only a single row of stitching, uneven tension at the fastening surface can be self-corrected and redistributed by limited movements. In various embodiments, slat 2 comprises a substantially rigid material, such as polymer material, plastic, hard rubber, or others. It is to be appreciated that the fastening surface 1 can be bounded to slat 2 by adhesives and/or other means as well.

Figure 9:
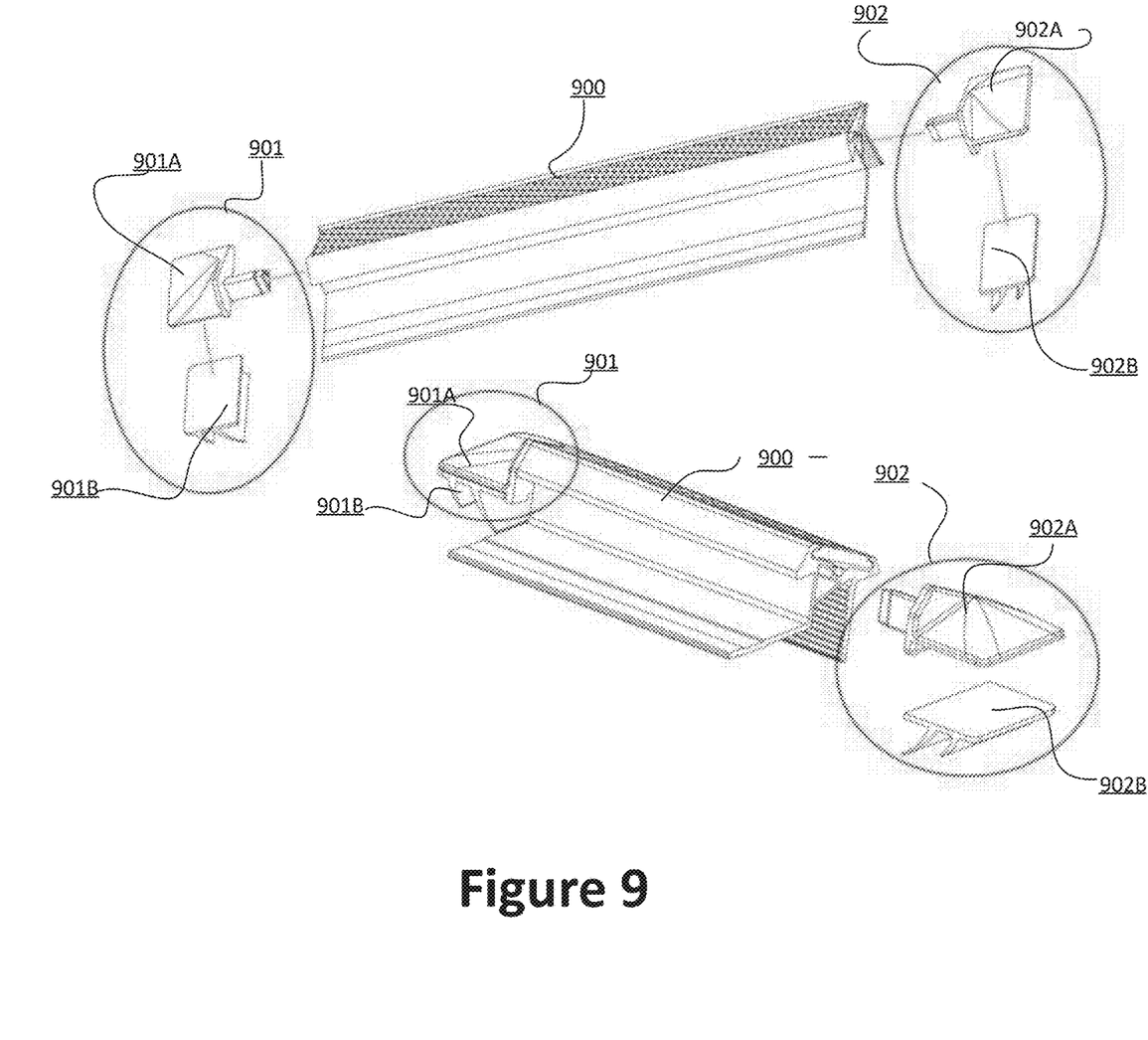
FIG. 9 is a simplified diagram illustrating a side rail 900 with seal caps according to embodiments of the present invention.

It is to be appreciated that side rail 200 illustrated in FIG. 2 can be implemented in various ways. FIG. 9 is a simplified diagram illustrating a side rail 900 with seal caps according to embodiments of the present invention. This diagram is merely an example, which should not unduly limit the scope of the claims. One of ordinary skill in the art would recognize many variations, alternatives, and modifications. Side rail 900 as shown on top portion of FIG. 9 has seal caps removed. On the bottom, FIG. 9 shows side rail 900 having seal caps installed.

Side rail 900 includes two side caps. On the left side, end cap 901 comprises a top portion 901A and bottom portion 901B. On the right side, end cap 902 comprises a top portion 902A and a bottom portion 902B. For example, top portion 901A may be glued onto bottom portion 901B. It is to be appreciated that top portion 901A can be coupled to the bottom portion 902B using other means as well. When side rail 900 is mounted on a truck bed, the bottom portions 901B and 902B keep water out with their respective fins as shown. For example, bottom portion 902B comprises two fins that are shaped inward toward the truck bed (once installed). When water drips from top portion 902A to bottom 902B, water drops would drop down vertically and not going into the interiors of the truck bed.

Figure 10:
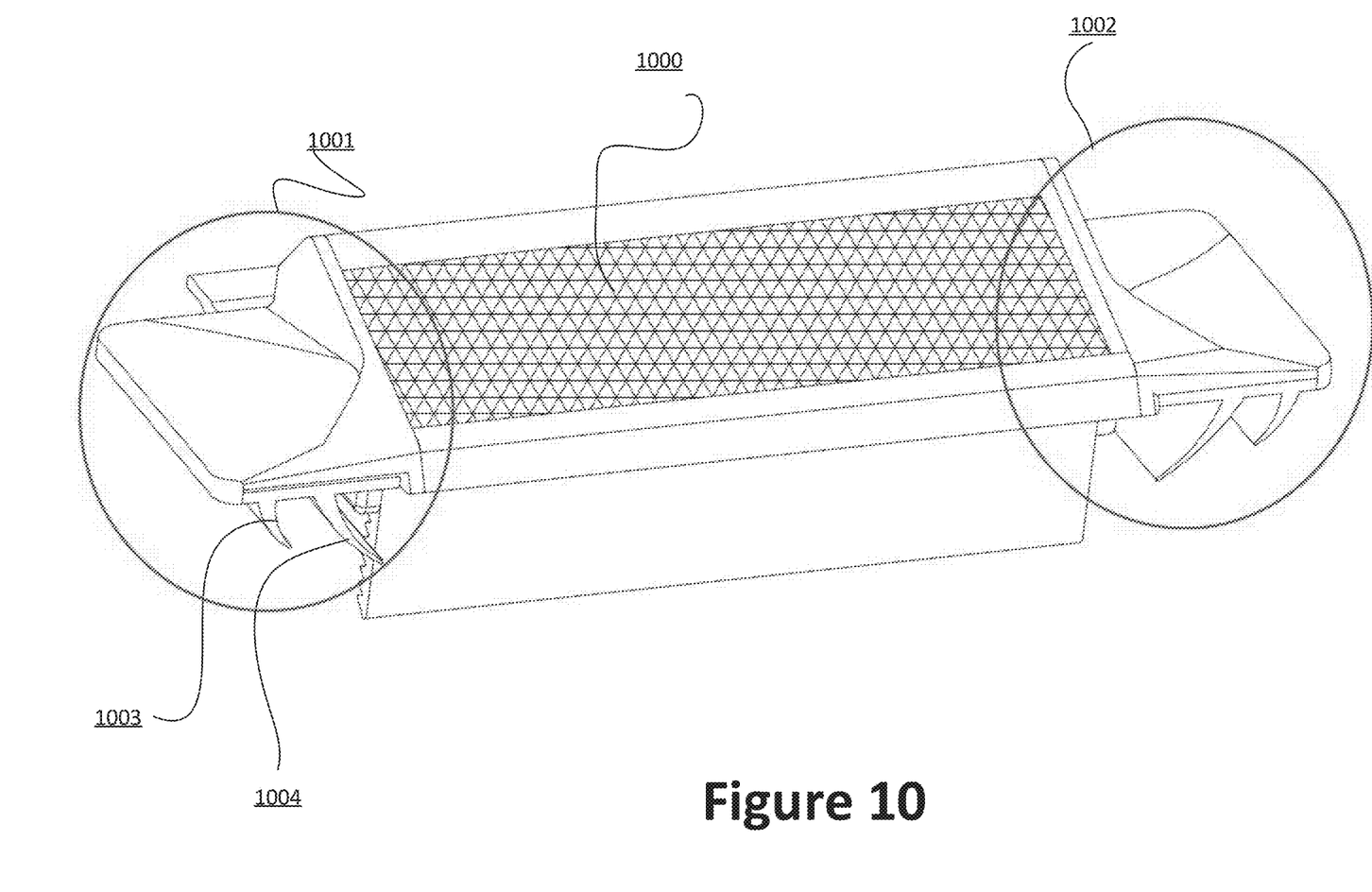
FIG. 10 shows a side rail 1000 having two end caps according to embodiments of the present invention.

FIG. 10 shows a side rail 1000 having two end caps according to embodiments of the present invention. This diagram is merely an example, which should not unduly limit the scope of the claims. One of ordinary skill in the art would recognize many variations, alternatives, and modifications. End caps 1001 and 1002 are mounted on the left and right sides of the side rail 1000 as shown. End cap 1001 includes two fins 1003 and 1004 to keep water out. It is to be appreciated that for the purpose of water sealing, ends caps mounted on side rail 1000 can have a different numbers of fins provide environmental sealing.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A flexible tonneau cover system for covering a bed of a pickup truck, the system comprising:

a first end rail comprising a first opening and a second opening;

a first corner member comprising a plurality of tabs and a screw housing, the plurality of tabs including a first tab and a second tab, the first tab being adjustably inserted into the first opening, the second tab being adjustably inserted into the second opening, the first tab comprising a first screw opening;

a first screw securing the first corner member to the first end rail via the first opening and the first screw opening;

a first side rail comprising a first fastening slot and a first mounting surface, the first mounting surface comprising a second screw opening, the second screw opening being characterized by an elongated shape to allow screw movement; and a second screw securing the first corner member to the first side rail via the screw housing and the second screw opening.

2. The system of claim 1 further comprising a mounting plate comprising a third screw opening, the third screw opening being characterized by the elongated shape.

3. The system of claim 2 wherein the second screw passes through the third screw opening.

4. The system of claim 1 further comprising a fastening mechanism positioned inside the fastening slot.

5. The system of claim 4 wherein the fastening mechanism comprises a fastening surface.

6. The system of claim 5 wherein the fastening surface comprises a plurality of hook fasteners.

7. The system of claim 4 wherein the fastening mechanism comprises a wrap surrounding a slate, the slate being secured within the wrap by a single row of stitching.

8. The system of claim 7 wherein the single row of stitching comprises a water-resistant thread.

9. The system of claim 1 further comprising a second corner member and a second rail member, the first end rail being coupled to the second rail member via the second corner member.

10. The system of claim 1 further comprising a second end rail member and a second corner member, the second end rail member being coupled to the first rail member via the second corner member.

11. The system of claim 10 a mounting member positioned on the mounting surface of the first rail member, the mounting member comprises an angled opening for the second corner member.

12. The system of claim 1 wherein the screw housing comprising a hexagonal opening to accommodate the second screw.

13. A flexible tonneau cover system for covering a bed of a pickup truck, the system comprising:

a first end rail;

a first corner member comprising a screw housing, the first corner member being coupled to the first end rail;

a first side rail comprising a first fastening slot and a first mounting surface, the first mounting surface comprising a first screw opening, the first screw opening being characterized by an elongated shape to allow screw movement;

a fastening mechanism positioned within the first fastening slot, the fastening mechanism comprising a wrap stitched to a slat, the wrap comprising a first fastening surface; and a first screw securing the first corner member to the first side rail via the screw housing and the first screw opening.

14. The system of claim 13 further comprising a soft cover attached to the first end rail.

15. The system of claim 14 wherein the software cover comprises a second fastening surface disengageably attached to first fastening surface.

16. The system of claim 15 wherein the first fastening surface comprises hook fasteners.

17. The system of claim 15 wherein the first fastening surface comprises loop fasteners.

18. The system of claim 13 wherein the wrap is stitched to the slate via a single row of stitches.

19. The system of claim 13 wherein the fastening mechanism is substantially water resistant.

20. The system of claim 13 wherein the first side rail comprises an end cap, the end cap comprising at least a fin.

* * * * *